US009318935B2

(12) United States Patent
Nakagami et al.

(10) Patent No.: US 9,318,935 B2
(45) Date of Patent: Apr. 19, 2016

(54) INVERTER-INTEGRATED ELECTRIC COMPRESSOR

(75) Inventors: Takashi Nakagami, Tokyo (JP); Koji Nakano, Tokyo (JP); Hiroyuki Kamitani, Tokyo (JP); Takayuki Takashige, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 655 days.

(21) Appl. No.: 13/699,905

(22) PCT Filed: Oct. 20, 2011

(86) PCT No.: PCT/JP2011/074134
§ 371 (c)(1),
(2), (4) Date: Nov. 26, 2012

(87) PCT Pub. No.: WO2012/056983
PCT Pub. Date: May 3, 2012

(65) Prior Publication Data
US 2013/0119834 A1      May 16, 2013

(30) Foreign Application Priority Data
Oct. 27, 2010   (JP) .................................. 2010-240849

(51) Int. Cl.
*H02K 9/22*     (2006.01)
*H02K 11/04*    (2006.01)
(Continued)

(52) U.S. Cl.
CPC ............ *H02K 11/044* (2013.01); *F04B 39/121* (2013.01); *F04B 53/08* (2013.01);
(Continued)

(58) Field of Classification Search
CPC ....... H02K 9/22; H02K 11/044; H02K 11/04; H02K 5/18; H02K 5/22
USPC .............................................. 310/64, 89, 68 D
See application file for complete search history.

(56) References Cited

U.S. PATENT DOCUMENTS

| | | | | |
|---|---|---|---|---|
| 5,589,711 A | * | 12/1996 | Sano et al. | ..................... 257/718 |
| 2003/0102729 A1 | * | 6/2003 | Sanuki | ............................ 310/58 |
| 2010/0209266 A1 | | 8/2010 | Ikeda et al. | |

FOREIGN PATENT DOCUMENTS

| CN | 1098844 A | 2/1995 |
|---|---|---|
| CN | 101355846 A | 1/2009 |

(Continued)

OTHER PUBLICATIONS

Office Action dated Feb. 28, 2015, issued in corresponding Chinese Patent Application No. 201180026487.5, w/ English translation. (14 pages).

(Continued)

*Primary Examiner* — Dang Le
(74) *Attorney, Agent, or Firm* — Westerman, Hattori, Daniels & Adrian, LLP (57) ABSTRACT

A control circuit board (25) configuring an inverter (21) serves as a thermally-conductive substrate. One surface of the control circuit board (25) is installed in a heat transferable manner on a heat-dissipating planar part (31) disposed on a housing (2), while heat-producing electrical components (39) are disposed in a heat transferable manner on the other surface of the control circuit board (25). The control circuit board (25) includes a substrate body (41) constituted of an insulator, and heat-conducting through members (42) constituted of a good thermal conductor filled through in a thickness direction of the substrate body (41). One end of each of the heat-conducting through members (42) is disposed in a heat transferable manner on the heat-dissipating planar part (31), and the electrical component (39) is disposed in a heat transferable manner on the other end.

7 Claims, 4 Drawing Sheets

(51) Int. Cl.
*F04B 39/12* (2006.01)
*F04B 53/08* (2006.01)
*H02K 11/00* (2006.01)
*H02K 5/22* (2006.01)
*F04C 23/00* (2006.01)
*F04C 29/04* (2006.01)
*F04C 18/02* (2006.01)

(52) U.S. Cl.
CPC ............ *F04C 23/008* (2013.01); *F04C 29/047* (2013.01); *H02K 5/22* (2013.01); *H02K 11/0073* (2013.01); *F04C 18/0215* (2013.01); *F04C 2240/808* (2013.01); *H02K 9/22* (2013.01)

(56) References Cited

FOREIGN PATENT DOCUMENTS

| | | |
|---|---|---|
| CN | 101809286 A | 8/2010 |
| JP | 10-150283 A | 6/1998 |
| JP | 2002-174178 A | 6/2002 |
| JP | 2003-347705 A | 12/2003 |
| JP | 2007-295639 A | 11/2007 |
| JP | 2008-021819 A | 1/2008 |
| JP | 2008-131792 A | 6/2008 |
| JP | 2009-017624 A | 1/2009 |
| JP | 2009-074517 A | 4/2009 |
| JP | 2009-207310 A | 9/2009 |
| WO | 2010/119514 A1 | 10/2010 |

OTHER PUBLICATIONS

Decision to Grant a Patent dated Dec. 24, 2014, issued in corresponding Japanese Patent Application No. 2010-240849, "Decision to Grant a Patent has been recieved" (3 pages).

International Search Report of PCT/JP2011/074134, mailing date Jan. 17, 2012.

Written Opinion of PCT/JP2011/074134, mailing date Jan. 17, 2012.

Notice of Granting a Patent Right for Invention dated Oct. 10, 2015 issued in counterpart Chinese patent application No. 201180026487.5, with English translation. The explanation of relevance-"The Notice of Granting a Patent Right for Invention has been received." (2 pages).

* cited by examiner

INVERTER-INTEGRATED ELECTRIC COMPRESSOR

TECHNICAL FIELD

The present invention relates to an inverter-integrated electric compressor which is configured by installing an inverter inside an inverter box provided at a housing outer periphery, and is especially preferable for use in a vehicle air conditioner.

BACKGROUND ART

In recent years, development of electric vehicles that travel with power of electric motors like an electric vehicle, a hybrid automobile, or a fuel cell automobile, and introduction of the electric vehicles into the market have been rapidly advanced. In many of the air conditioners in the electric vehicles as above, electric compressors using electric motors are also used as compressors which compress and feed refrigerants.

Further, in some of the air conditioners of automobiles which travel with the power of internal combustion engines, electric compressors are used to remedy reduction in drivability accompanying interruption of electromagnetic clutches, in place of the compressors which are driven by the internal combustion engines for traveling via the electromagnetic clutches.

As the electric compressors as above, encapsulated type electric compressors each integrally containing a compression mechanism and an electric motor in a housing are adopted, and many encapsulated type electric compressors in which electric power inputted from power supplies is supplied to electric motors via inverters, and the rotational speeds of the compressors can be variably controlled in accordance with air-conditioning loads are adopted.

In some of the electric compressors which are driven via inverters as above, the inverters and the electric compressors are integrated by housing and installing control circuit boards and the like configuring the inverters in the inverter boxes integrally molded on the housing outer peripheries of the electric compressors, and electrical components such as smoothing capacitors and coils which suppress electromagnetic noise are housed inside the above described inverter boxes.

In this case, high heat-producing electrical components such as switching elements (IGBT, Insulated Gate Bipolar Transistor) of the inverters need to be cooled. An inverter box is of a completely encapsulated structure, and cooling air or the like cannot be introduced from an outside. Therefore, as disclosed in, for example, Patent Literatures 1 to 3, a heat-dissipating planar part configuring an outer wall of a housing is formed inside the inverter box, the heat-producing electrical component is caused to abut on the heat-dissipating planar part, and by cold heat of the refrigerant flowing inside the housing, the heat of the electrical component is dissipated and cooled.

In each of the inverter-integrated electric compressors described in Patent Literatures 1 and 2, a heat-dissipating planar part is formed on a bottom surface of an inverter box, a heat-producing electrical component such as IGBT is installed on a top surface of the heat-dissipating planar part, a control circuit board is installed parallel above the electrical component via a space, and a pin terminal which extends upward from the electrical component is soldered to the control circuit board. In Patent Literature 1, the electrical component is pressed against the heat-dissipating planar part by the elastic force of an elastic member interposed between the control circuit board and the electrical component, whereas in Patent Literature 2, the electrical component is fastened to the heat-dissipating planar part with a vis. As a result of the above, the heat of the electrical components is dissipated to the heat-dissipating planar part sides.

Further, in the inverter-integrated electric compressor described in Patent Literature 3, a metal board is fixed onto a heat-dissipating planar part formed on a bottom surface of an inverter box, a heat-producing electrical component is loaded on the metal board, a control circuit board is installed parallel above the electrical component via a space, and the heat of the electrical component is dissipated to the heat-dissipating planar part side via the metal board.

CITATION LIST

Patent Literatures

{PTL 1}
Japanese Unexamined Patent Application, Publication No. 2007-295639
{PTL 2}
Japanese Unexamined Patent Application, Publication No. 2008-131792
{PTL 3}
Japanese Unexamined Patent Application, Publication No. 2009-207310

SUMMARY OF INVENTION

Technical Problem

However, in each of the inverter-integrated electric compressors of Patent Literatures 1 and 2, a space for disposing the elastic member and the vises is required between the control circuit board and the heat-producing electrical component, and therefore, the height of the inverter box becomes large, which causes increase in the size of the inverter-integrated electric compressor.

Further, in the inverter-integrated electric compressor of Patent Literature 2, a vis-fastened type electrical component is used. However, the vis-fastened type electrical component becomes large in size correspondingly to the space in which the vis hole through which the vis is penetrated has to be formed as compared with a surface-mount type electrical component. This increases the dimension in the plane direction of the control circuit board, and this point causes increase in sizes of the inverter box and the inverter-integrated electric compressor.

For example, even if a surface-mount type electrical component is loaded on the conventional glass epoxy board, and the glass epoxy board is fixed onto the heat-dissipating planar part on the inverter box bottom surface, heat of the electrical component is insulated due to the glass epoxy board with a low thermal conductivity, and the heat of the electrical component is not favorably transferred to the heat-dissipating planar part. Therefore, the structure which fastens the electrical component to the heat-dissipating planar part with a vis, or presses the electrical component against the heat-dissipating planar part with an elastic member, is adopted, and causes increase in the dimensions in the height direction and the plane direction of the control circuit board as described above.

Further, in the inverter-integrated electric compressor of Patent Literature 3, a heat-producing electrical component is loaded on the metal board fixed onto the heat-dissipating planar part, and the heat of the electrical component is dissipated to the heat-dissipating planar part side via the metal board. However, the metal board has the demerit of increasing the production cost and also having a large weight, and is difficult to have multilayered board patterns therein. Therefore, when a metal board is used, the dimension in the board plane direction inevitably becomes large, and miniaturization of the inverter is inhibited.

A noise suppressing member such as a capacitor and a coil is mounted on a control circuit board to suppress electromagnetic noise. However, if the noise suppressing member like this is loaded on the control circuit board by the installation structures as in Patent Literatures 1 and 2, the distance between the noise suppressing member and the control circuit board becomes large, and the lengths of the wiring members such as a pin terminal and a bus bar for electric connection become long. Therefore, there is the fear of increasing an inductance component and reducing the noise suppression action, and in order to make up the deficiency, the capacity of the noise suppressing member has to be made large, which also hinders miniaturization of the inverter.

The present invention is made in the light of the circumstances as above, and has an object to provide an inverter-integrated electric compressor that effectively cools high heat-producing electrical components disposed on a control circuit board, at the same time as which, makes an inverter and an inverter-integrated electric compressor compact and light, and can enhance a noise suppression effect, by an inexpensive and simple structure.

Solution to Problem

In order to solve the above described problems, the present invention adopts the following solutions.

More specifically, an inverter-integrated electric compressor according to one aspect of the present invention is an inverter-integrated electric compressor configured to include an inverter box provided on an outer surface of a housing that contains a compressor for a refrigerant and an electric motor that drives the compressor, an inverter that has a control circuit board and is housed and installed in the inverter box, and a heat-producing electrical component that is loaded on the control circuit board and constitutes the inverter, in which a heat-dissipating planar part that constitutes an outer wall of the housing is formed inside the inverter box, and heat of the electrical component is cooled by being dissipated to the heat-dissipating planar part side, wherein the control circuit board serves as a thermally-conductive substrate, one surface of the thermally-conductive substrate is installed in a heat transferable manner on the heat-dissipating planar part, and the electrical component is provided in a heat transferable manner on the other surface of the thermally-conductive substrate.

According to one aspect of the present invention, the control circuit board which is a thermally-conductive substrate is directly placed on the heat-dissipating planar part formed inside the inverter box without a space interposed therebetween, and further on the control circuit board, the high heat-producing electrical component is directly installed. Therefore, no useless space exists between the heat-dissipating planar part, the control circuit board and the electrical component. As a result, the dimension in the height direction of the inverter can be made drastically compact, which can significantly contribute to miniaturization of the entire inverter-integrated electric compressor. In addition, the heat of the high heat-producing electrical component is quickly dissipated to the heat-dissipating planar part side via the control circuit board which is a thermally-conductive substrate, and therefore, the heat of the electrical component is efficiently cooled.

Further, the inverter-integrated electric compressor according to one aspect of the present invention may be configured such that the thermally-conductive substrate is constituted of a substrate body constituted of an insulator, and a heat-conducting through member which is constituted of a good thermal conductor and is filled through in a thickness direction of the substrate body, and in the heat-conducting through member, one end surface thereof is disposed in a heat transferable manner on the heat-dissipating planar part, and the electrical component is disposed in a heat transferable manner on the other end surface.

According to the above described configuration, the substrate body of the thermally-conductive substrate can be formed from a conventional inexpensive glass epoxy material or the like, and the heat-conducting through member can be formed from a metal such as copper. Therefore, as compared with the case in which the control circuit board is made a metal board as in the conventional control circuit board, the control circuit board can be of an inexpensive and simple structure. In addition, if the substrate body is formed from a glass epoxy material, multilayer can be easily achieved, and therefore, the number of substrates can be decreased, which can significantly contribute to simplification of the structure of the inverter, miniaturization, facilitation of assembly, and cost reduction. Further, if a good thermal conductor such as copper is used as the heat-conducting through member, the heat of the high heat-producing electrical components is quickly dissipated to the heat-dissipating planar part side, and the cooling effect of the electrical component can be enhanced.

Further, in the above described configuration, a thickness of the heat-conducting through member is set to be slightly larger than a thickness of the substrate body, and out of both the end surfaces of the heat-conducting through member, at least the end surface which is in contact with the heat-dissipating planar part is slightly projected from an outer surface of the substrate body.

According to the above described configuration, the end surface of the heat-conducting through member is reliably in contact with the heat-dissipating planar part, and therefore, the heat of the electrical component which is in contact with the end surface at the opposite side of the heat-conducting through member is efficiently transmitted to the heat-dissipating planar part via the heat-conducting through member. Further, an air layer is hardly formed between the end surface at the electrical component side of the heat-conducting through member and the electrical component, and the heat of the electrical component is easily transferred to the heat-conducting through member. Therefore, the cooling effect of the electrical component can be further enhanced.

Further, in an inverter-integrated electric compressor according to one aspect of the present invention, the electrical component is of a surface mount type which is directly mounted on a surface of the control circuit board. In the surface mount type electrical component, a vis hole through which a vis is penetrated does not have to be formed as in a vis-fastened type electrical component, and therefore, the size thereof is small, and the area which the electrical component occupies on the control circuit board is also small. Accordingly, the dimension in the plane direction of the control circuit board is reduced, and the inverter, and the inverter-integrated electric compressor can be made compact.

Furthermore, in an inverter-integrated electric compressor according to one aspect of the present invention, the control circuit board is a multilayered board. When the control circuit board is made the multilayered board like this, the substrates a plurality of which are originally required can be integrated into one. Therefore, the dimensions in the plane direction and the height direction of the inverter can be made compact, and at the same time, the number of components is reduced to facilitate assembly, whereby production cost can be reduced.

In an inverter-integrated electric compressor according to one aspect of the present invention, the inverter box is provided on an end surface of the housing. According to the present configuration, miniaturization in the length direction and reduction in weight of the inverter-integrated electric compressor can be achieved. More specifically, in the conventional inverter-integrated electric compressor, the control circuit board cannot be directly installed on the heat-dissipating planar part. Therefore, in the end surface of the housing, the control circuit board is installed in accordance with the tallest electrical component, whereas the other shorter electrical components are installed on the undersurface side of the control circuit board, and among them, the heat-producing electrical components are caused to abut on the heat-dissipating planar part by raising the height of the heat-dissipating planar part to cool. Therefore, a useless thickness is added to the heat-dissipating planar part to increase the thickness of the housing end surface to be more than necessary, which leads to increase in size and increase in weight. However, according to the present configuration, the control circuit board can be directly installed on the heat-dissipating planar part, and therefore, a useless thickness does not have to be added to the heat-dissipating planar part, which can contribute to miniaturization and reduction in weight.

Furthermore, in an inverter-integrated electric compressor according to one aspect of the present invention, the electrical component that is mounted on the control circuit board is a switching element. The switching element produces the largest heat amount among the electrical components configuring the inverter. Therefore, the heat thereof is quickly dissipated to the heat-dissipating planar part via the heat-conducting through member that is filled through the control circuit board which is a thermally-conductive substrate, whereby the entire inverter can be efficiently cooled.

Further, in an inverter-integrated electric compressor according to one aspect of the present invention, the electrical component that is mounted on the control circuit board is a noise suppressing member. In such a case, the noise suppressing member is directly installed on the control circuit board, and therefore, the lengths of the wiring members such as a pin terminal and a bus bar which electrically connect the noise suppressing member and the control circuit board can be made minimum, whereby the inductance components of the wiring members reduce. Therefore, the noise suppression effect of the noise suppressing member is enhanced.

Advantageous Effects of Invention

As above, according to the inverter-integrated electric compressor of the present invention, the high heat-producing electrical components provided on the control circuit board can be effectively cooled, at the same time as which, the inverter and the inverter-integrated electric compressor can be made compact and light, and noise suppression effect can be enhanced, by the inexpensive and simple structure.

DESCRIPTION OF EMBODIMENTS

First Embodiment

Figure 1:
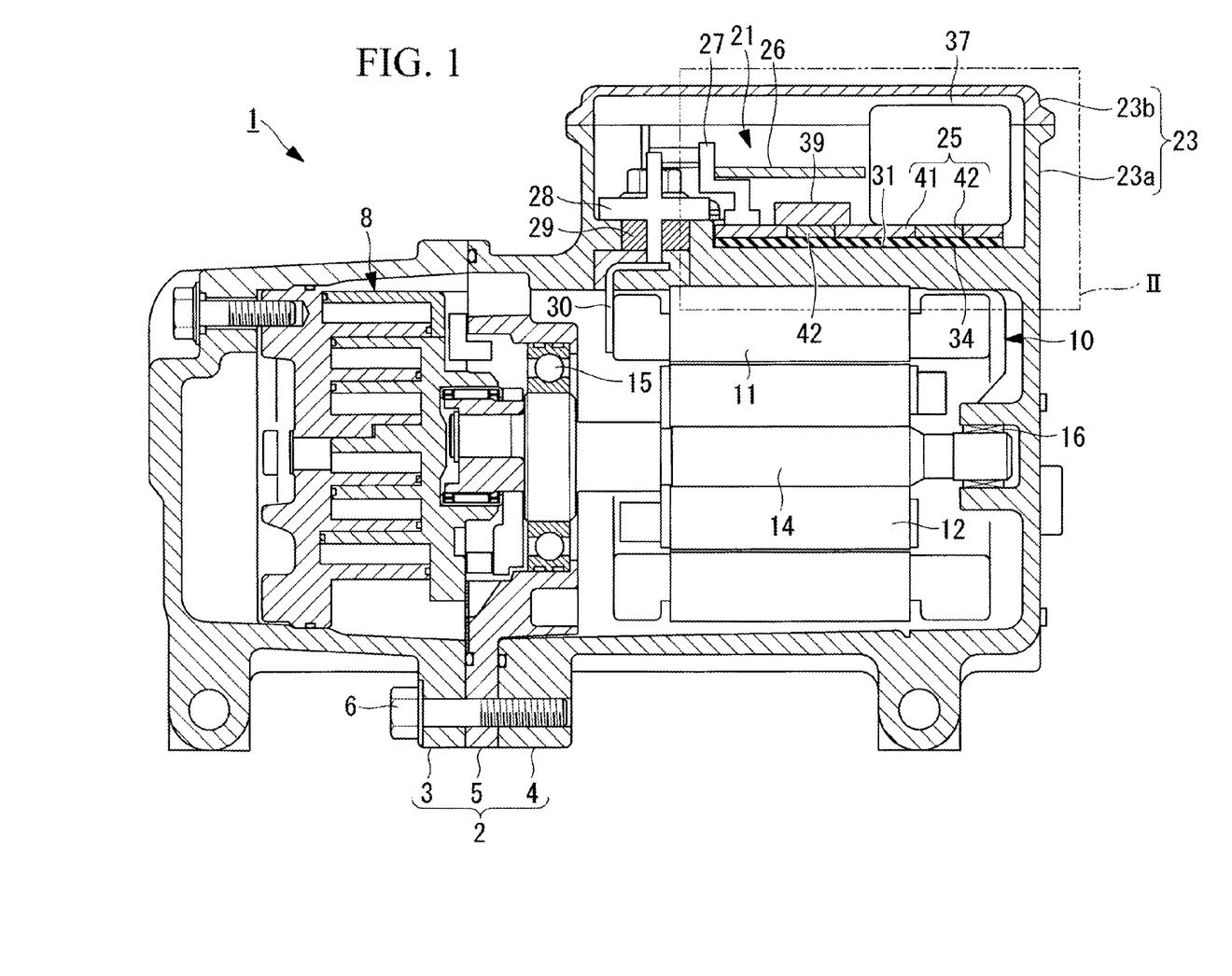
FIG. 1 is a vertical sectional view explaining a schematic configuration of an inverter-integrated electric compressor which is a first embodiment of the present invention.

FIGS. 1 to 4 show a first embodiment of the present invention. FIG. 1 is a vertical sectional view explaining a schematic configuration of an inverter-integrated electric compressor which is the first embodiment of the present invention. An inverter-integrated electric compressor 1 is a compressor for use in an air conditioner for a vehicle, and has a drive rotational speed controlled by an inverter.

The inverter-integrated electric compressor 1 has a housing 2 of an aluminum alloy which forms an outer shell thereof, and the housing 2 is configured by fastening and fixing a compressor side housing 3 and an electric motor side housing 4 by a bolt 6, with a bearing housing 5 sandwiched therebetween.

A known scroll compression mechanism 8 is incorporated in the compressor side housing 3. Further, a stator 11 and a rotor 12 which constitute an electric motor 10 are incorporated in the electric motor side housing 4. The scroll compression mechanism 8 and the electric motor 10 are connected via a main shaft 14, and are configured so that the scroll compression mechanism 8 is driven by rotating the electric motor 10. The main shaft 14 is rotatably supported pivotally by a main bearing 15 held by the bearing housing 5, and a sub bearing 16 held at an end portion of the electric motor side housing 4.

Further, a refrigerant intake port not illustrated is provided at an end portion of the electric motor side housing 4, and an intake piping of a refrigerant cycle is connected to the refrigerant intake port, so that a low-pressure refrigerant gas is taken into the electric motor side housing 4. The refrigerant gas is configured to flow in the electric motor side housing 4 and cool the electric motor 10, thereafter, be taken into the scroll compression mechanism 8, where the refrigerant gas is compressed to be a high-temperature and high-pressure refrigerant gas, and to be discharged into discharge piping of the refrigerant cycle from a discharge port not illustrated which is provided at an end portion of the compressor side housing 3.

The electric motor 10 is driven via an inverter 21, and a rotational speed thereof is variably controlled in accordance with an air conditioning load. In the first embodiment, the inverter 21 is configured by, for example, a lower board 25 and an upper board 26 which are the control circuit board being housed and installed in such a manner as to be overlaid on each other vertically inside an inverter box 23 which is rectangular in plan view and integrally formed on an outer periphery of the housing 2, for example, a top surface of the housing 2, and the inverter 21 is integrated with the inverter-integrated electric compressor 1.

The inverter 21 is electrically connected to the electric motor 10 via a bus bar 27, an inverter output terminal 28, a motor terminal 29, a lead wire 30 and the like. In the present embodiment, for example, the lower board 25 is a power module board loaded with a number of heat-producing electrical components (heat-generating elements) which will be described later, and the upper board 26 is a CPU board loaded with an element which is operated at a low voltage such as a CPU not illustrated.

The inverter box 23 has a structure in which a circumferential wall 23a is integrally formed at a top portion of, for example, the electric motor side housing 4, and an upper opening thereof is liquid-tightly closed by a lid member 23b. A depth of the inverter box 23 is made such a depth that the lower board 25 and the upper board 26 can be housed and installed therein with a predetermined space vertically kept therebetween, and an electrical component such as a tall smoothing capacitor 37 can be further installed on a top surface of the lower board 25.

Figure 2:
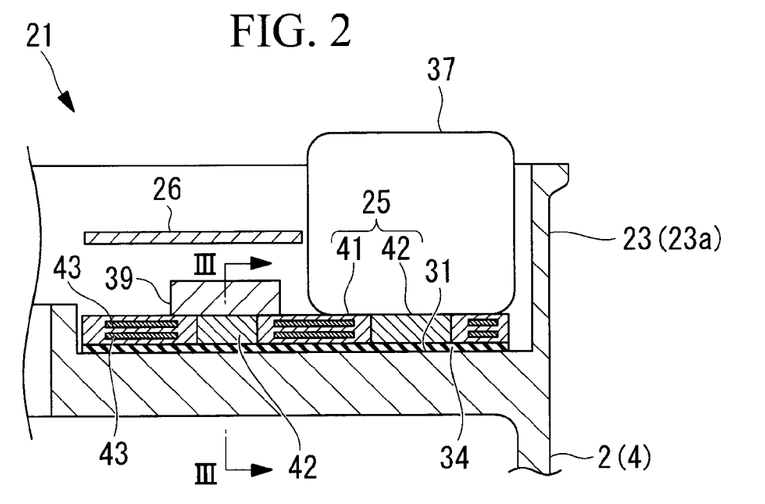
FIG. 2 is a vertical sectional view of the enlarged II part of FIG. 1.
Figure 3:
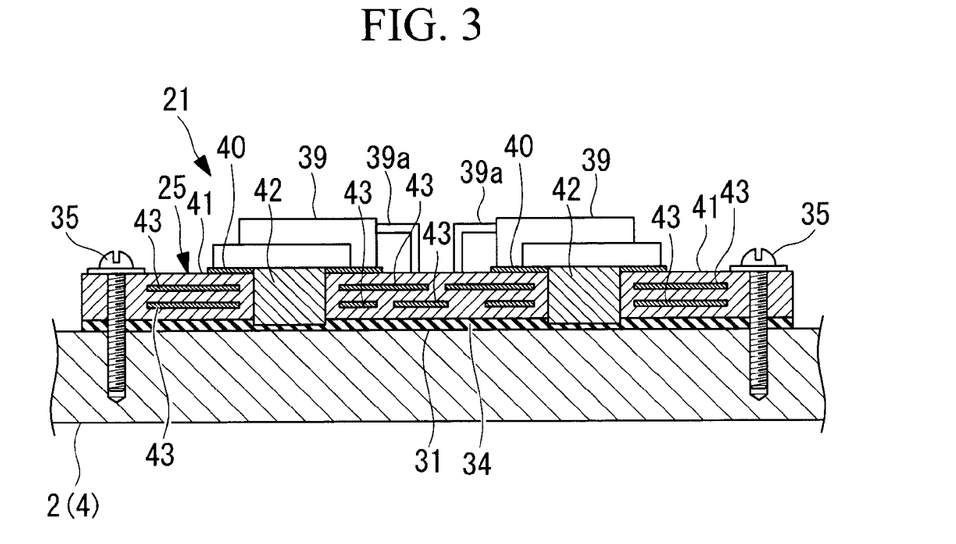
FIG. 3 is a view showing the first embodiment of the present invention by a vertical sectional view taken along the III-III line of FIG. 2.

As also shown in FIGS. 2 and 3, a bottom portion of the inverter box 23 constitutes an outer wall of the electric motor side housing 4, and on the bottom portion, the lower board 25 and a heat-dissipating planar part 31 which is parallel with the upper board 26 and the lid member 23b are formed. The lower board 25 is a thermally-conductive substrate, and is fixed to a top surface of the heat-dissipating planar part 31 via an insulating sheet 34 with conductivity with a plurality of vises 35 or the like, and an undersurface (one surface) of the lower board 25 is installed in a heat-transferable manner on the heat-dissipating planar part 31.

Figure 4:
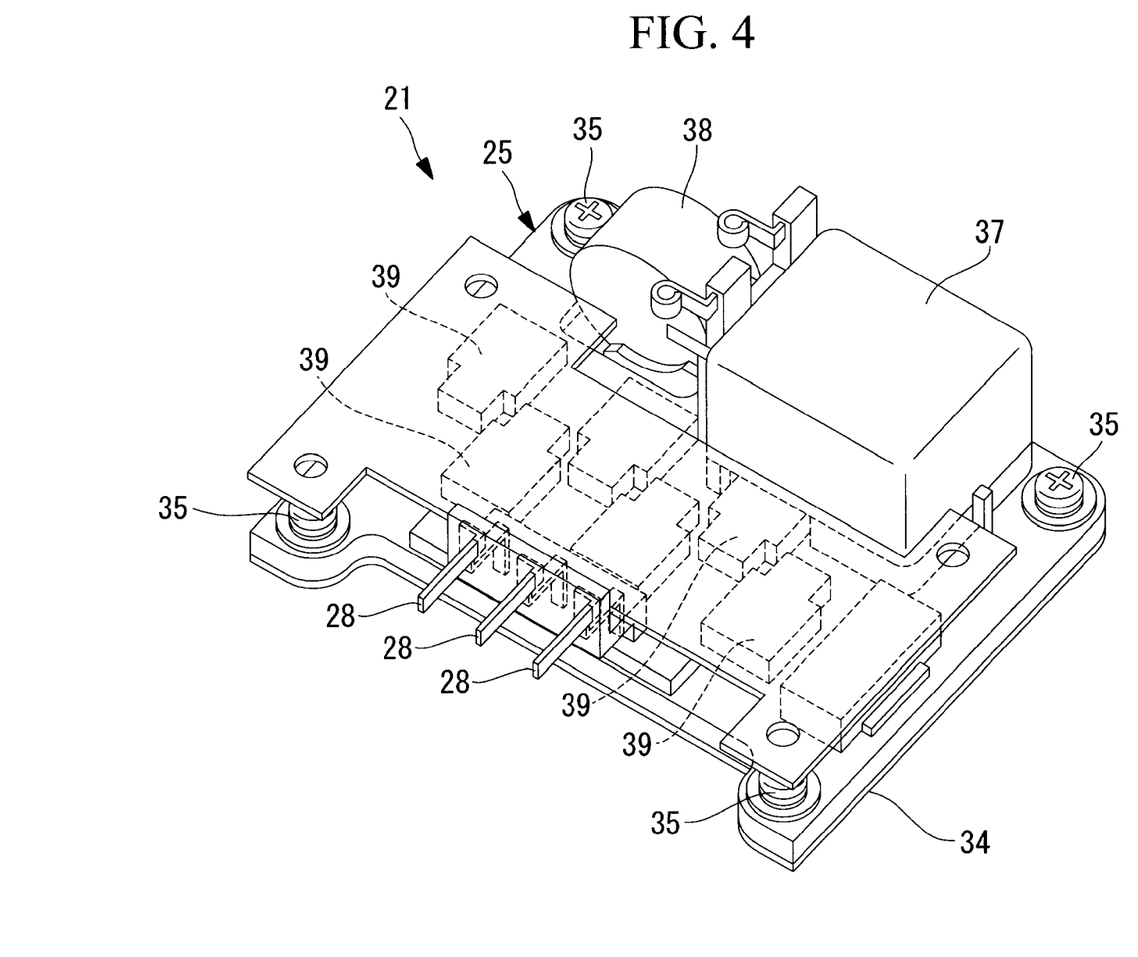
FIG. 4 is a perspective view of an inverter.

As also shown in FIG. 4, on a top surface (the other surface) of the lower board 25, heat-producing electrical components such as the smoothing capacitor 37, a coil 38 and six switching elements (IGBT) 39 are loaded in a heat transferable manner. The respective electrical components 37, 38 and 39 are of surface mount types which are directly mounted on the surface of the lower board 25. In the switching elements 39, a plurality of pin terminals 39a are soldered to the lower board 25, and undersurfaces thereof are soldered to planar terminals 40 (see FIG. 3) which are formed on the top surface of the lower board 25, whereby installation is completed in a manner in which the switching elements 39 are in close contact with the lower board 25. The smoothing capacitor 37 and the coil 38 are noise suppressing members which suppress electromagnetic noise.

Meanwhile, the upper board 26 is installed above the lower board 25 in a parallel manner with a predetermined space via, for example, a spacer member not illustrated, and is fixed to the lower board 25 with a vis or the like. The size of the upper board 26 is smaller than the lower board 25, and the upper board 26 is provided in such a manner as to avoid the tall smoothing capacitor 37 and coil 38 which are loaded on the top surface of the lower board 25 and cover top parts of the short six switching elements 39.

The lower board 25 which is a thermally-conductive substrate is configured by including a substrate body 41 constituted of an insulator such as glass epoxy and a phenol resin, and a heat-conducting through member 42 which is filled through in a thickness direction of the substrate body 41 and is constituted of, for example, a good thermal conductor such as copper. The lower board 25 is a multilayered board with a plurality of circuit patterns 43 are stacked in layer and buried inside the substrate body 41. The heat-conducting through members 42 are located on the lower board 25 to conform to the loading positions of the smoothing capacitor 37, the coil 38 and the six switching elements 39, and one end surface thereof (undersurface) is in contact with the heat-dissipating planar part 31 in a heat transferable manner via the insulating sheet 34 including a thermal conductivity and elasticity, whereas the respective electrical components 37, 38 and 39 are in contact with the other end surface (top surface) in a heat transferable manner.

As shown in FIG. 3, a thickness of the heat-conducting through member 42 is set to be slightly larger than a thickness of the substrate body 41 so that at least an end surface (lower end surface) on the heat-dissipating planar part 31 (insulating sheet 34) side, of the heat-conducting through member 42 is slightly projected from an outer surface (undersurface) of the substrate body 41 to be reliably in contact with the heat-dissipating planar part 31 (insulating sheet 34). As described above, if the lower board 25 is fixed to the top surface of the heat-dissipating planar part 31 with a plurality of vises 35, the lower end surface of the heat-conducting through member 42 is pressed against the insulating sheet 34 with elasticity. The heat-conducting through member 42 is, for example, in the shape of a circular column, but may be in the shape a square pole or the like in accordance with the installation surface shapes of the electrical components 37, 38 and 39.

In FIG. 3, an upper end surface of the heat-conducting through member 42 is also projected from the top surface of the substrate body 41, but in reality, a projected amount of the upper end surface of the heat-conducting through member 42 does not have to be as large as that at the lower end surface side, and in order to enhance reliability of the soldering of the electrical components such as the switching elements 39, a height of the upper end surface of the heat-conducting through member 42 is preferably set at substantially the same height as the height of the top surface of the planar terminal 40 which is set on the top surface of the lower board 25, and the upper end surface of the heat-conducting through member 42 and the undersurfaces of the electrical components are in contact with each other, so that no air layer is formed therebetween.

When the inverter-integrated electric compressor 1 configured as above is operated, the low-pressure refrigerant gas circulating in the refrigeration cycle is taken into the electric motor side housing 4 from the refrigerant intake port not illustrated, flows in the electric motor side housing 4 and is taken into the scroll compression mechanism 8. The refrigerant gas which is compressed in the scroll compression mechanism 8, and has a high-temperature and high-pressure is circulated to the refrigeration cycle via the discharge piping from the discharge port not illustrated provided at the end portion of the compressor side housing 3.

During the above, the low-temperature and low-pressure refrigerant gas which flows inside the electric motor side housing 4 performs a heat-absorbing action with respect to the operation heat emitted from the inverter 21 via the heat-dissipating planar part 31 which is also the housing outer wall of the electric motor side housing 4, inside the inverter box 23. As a result, the lower board 25 which is a power board can be forcefully cooled.

In particular, the smoothing capacitor 37, the coil 38 and the switching elements 39 which are heat-producing elements loaded on the lower board 25 have the respective undersurfaces thereof in close contact with the top surfaces of the heat-conducting through members 42 which are good thermal conductors and filled through in the thickness direction of the lower board 25 which is the thermally-conductive substrate, and the undersurfaces of the heat-conducting through members 42 are in contact with the heat-dissipating planar part 31 in the heat transferable manner via the insulating sheet 34 with thermal conductivity. Therefore, the heat of the respective electrical components 37, 38 and 39 is quickly transferred to the heat-dissipating planar part 31 side via the heat-conducting through members 42, and the respective electrical components 37, 38 and 39 are efficiently cooled. In particular, the six switching elements 39 have large heat production amounts, and therefore, the heat thereof is quickly dissipated to the heat-dissipating planar part 31 side via the heat-conducting through member 42, whereby the entire inverter 21 is efficiently cooled, and rise of the internal temperature of the inverter box 23 is prevented. Instead of interposing the insulating sheet 34 between the lower board 25 and the heat-dissipating planar part 31, coating of a heat-conductive insulating paste or the like may be adopted.

According to the configuration of the present embodiment, the lower board 25 can be placed on the heat-dissipating planar part 31 which is formed inside the inverter box 23 without interposition of a space, and the electrical components 37, 38 and 39 are further directly loaded on the top surface of the lower board 25. Therefore, a useless space does not exist between the heat-dissipating planar part 31, and the lower board 25 and the electrical components 37, 38 and 39, whereby the dimension in the height direction of the inverter 21 can be drastically reduced, which can significantly contribute to miniaturization of the entire inverter-integrated electric compressor 1.

Further, the lower board 25 which is a thermally-conductive substrate is configured by including the substrate body 41 constituted of an insulator, and the heat-conducting through members 42 which are constituted of good thermal conductors and are filled through in the thickness direction of the substrate body 41, and therefore, the substrate body 41 can be configured by an inexpensive insulator such as glass epoxy and a phenol resin. Further, even if copper is used for the heat-conducting through member 42, the required amount thereof can be the minimum amount for only the lower portions of the electrical components 37, 38 and 39. Accordingly, as compared with the case in which the entire lower board 25 is made of, for example, a metal board, the lower board 25 can be configured to be inexpensive, light and simple. In addition, if copper is used as the heat-conducting through members 42, the heat-dissipating efficiency of the electrical components 37, 38 and 39 are enhanced by the high thermal conductivity of the copper, and at the same time, the fear can be excluded, that the heat-conducting through members 42 thermally expand when heated to press the electrical components 37, 38 and 39, because copper has a significantly lower thermal expansion coefficient as compared with aluminum and the like.

In addition, the thickness of the heat-conducting through member 42 is set to be slightly larger than the thickness of the substrate body 41, and of both the end surfaces of the heat-conducting through member 42, at least the end surface which is in contact with the heat-dissipating planar part 31 is slightly projected from the outer surface of the substrate body 41. Therefore, the end surfaces of the heat-conducting through members 42 are reliably brought into contact with the heat-dissipating planar part 31 (insulating sheet 34), and the heat of the electrical components 37, 38 and 39 in contact with the end surfaces at the opposite side of the heat-conducting through members 42 can be efficiently transferred to the heat-dissipating planar part 31 through the heat-conducting through members 42. Therefore, the cooling effect of the electrical components 37, 38 and 39 can be significantly enhanced.

Further, the electrical components 37, 38 and 39 are of surface mount types which are directly mounted on the surface of the lower board 25, and do not have to form vis holes in which vises are penetrated as vis-fastened type electrical components. Therefore, the sizes of the respective electrical components 37, 38 and 39 are small, and the areas occupied by the electrical components on the lower board 25 are also small. Therefore, the dimension in the plane direction of the lower board 25 is reduced, and in this point, the present invention can contribute to miniaturization of the inverter 21 and the inverter-integrated electric compressor 1.

Furthermore, the lower board 25 is made a multilayered board, and therefore, a power module board which is originally configured by a plurality of substrates can be configured by one lower board 25. Therefore, the dimensions in the plane direction and the height direction of the inverter 21 can be made compact, and at the same time, assembly of the inverter 21 and the periphery thereof is facilitated by reducing the number of components, whereby reduction in production cost and weight of the inverter-integrated electric compressor 1 can be achieved.

The smoothing capacitor 37 and the coil 38 are noise suppressing members which suppress electromagnetic noise. The smoothing capacitor 37 and the coil 38 are of the structures which are directly installed on the lower board 25, and therefore, the lengths of the wiring members such as the pin terminals and the bus bars not illustrated which electrically connect the smoothing capacitor 37 and the coil 38 and the lower board 25 can be made the minimum. Therefore, the inductance components of the wiring members can be reduced, and the noise suppression effect of the smoothing capacitor 37 and the coil 38 can be enhanced, or while the equivalent noise suppression effect is obtained, the smoothing capacitor 37 and the coil 38 are made compact, and the inverter 21 and the periphery thereof can be made compact.

Second Embodiment

Figure 5:
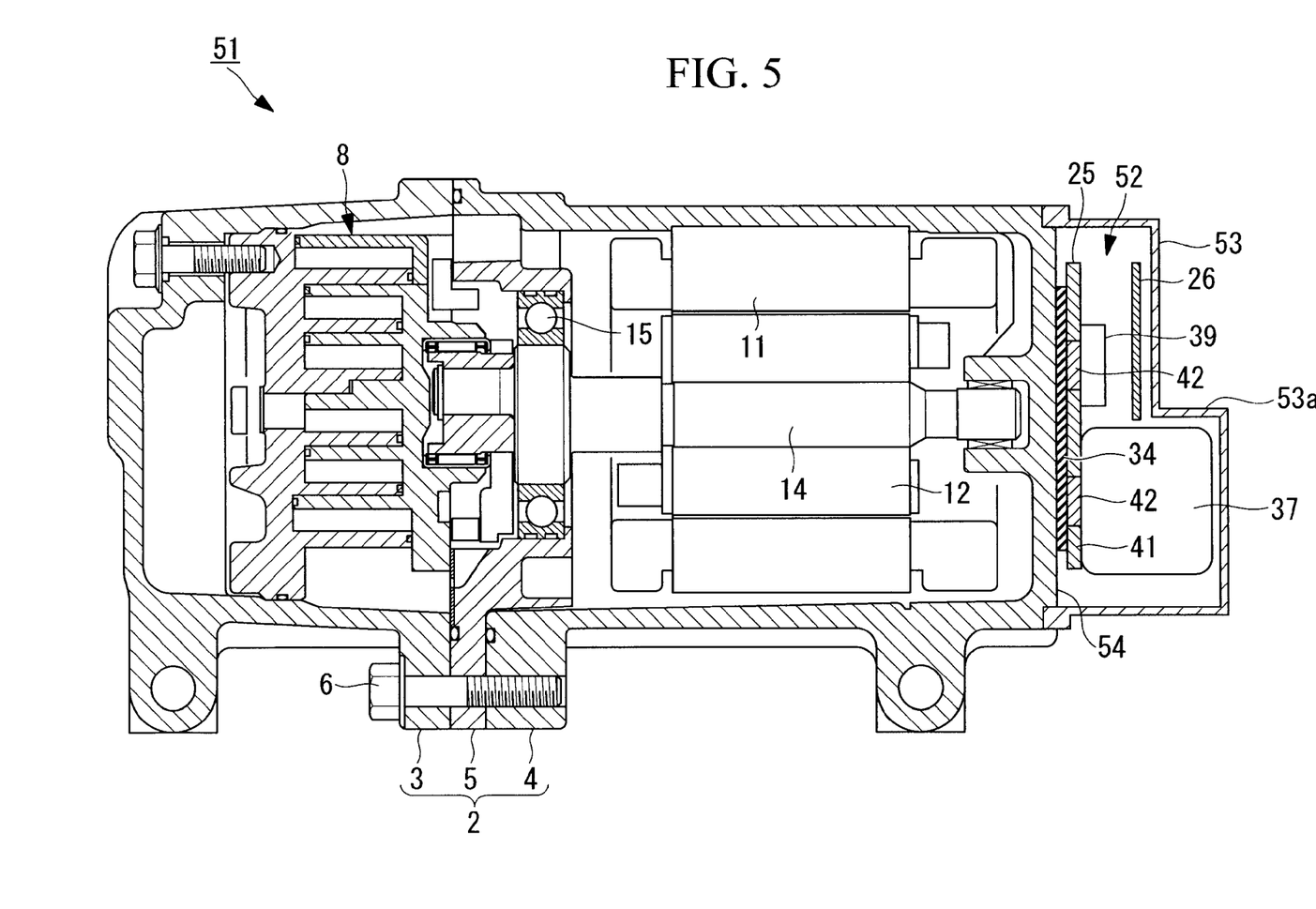
FIG. 5 is a vertical sectional view of an inverter-integrated electric compressor showing a second embodiment of the present invention.

FIG. 5 is a vertical sectional view of an inverter-integrated electric compressor showing a second embodiment of the present invention. In an inverter-integrated electric compressor 51, the configuration other than those of an inverter 52 and a periphery thereof is the same as in the inverter-integrated electric compressor 1 of the first embodiment shown in FIG. 1, and therefore, the same reference signs are assigned to the respective components and the description thereof will be omitted.

The inverter-integrated electric compressor 51 is of a type in which an inverter box 53 housing the inverter 52 is provided at a rear end surface of the housing 2 (electric motor side housing 4). The main reason of providing the inverter box 53 at the rear end surface of the housing 2 like this is that when the inverter-integrated electric compressor 51 is installed in the engine room of a hybrid vehicle, an electric vehicle or the like, the inverter-integrated electric compressor 51 in a slim shape in which the inverter box 53 is not projected at the outer peripheral surface of the housing 2 in a substantially circular column shape is easily loaded from the viewpoint of layout.

On the rear end surface configuring the outer wall of the electric motor side housing 4, a flat heat-dissipating planar part 54 is formed, the cover-shaped inverter box 53 which is formed of a metal or a resin is air-tightly put thereon in such a manner as to cover the heat-dissipating planar part 54, and the inverter 52 is housed in a clearance between the heat-dissipating planar part 54 and the inverter box 53. A basic configuration of the inverter 52 is the same as the inverter 21 in the first embodiment. Therefore, the respective components are assigned with the same reference signs, and the description thereof will be simplified.

The plane directions of the lower board 25 and the upper board 26 which constitute the inverter 52 are parallel with a plane direction of the heat-dissipating planar part 54. As in the inverter 21 in the first embodiment, the lower board 25 which is the thermally-conductive substrate configured by including the substrate body 41 and the heat-conducting through member 42 is fixed to the top surface of the heat-dissipating planar part 31 via the insulating sheet 34 with thermal conductivity, and the smoothing capacitor 37, the switching elements 39 and the like which are heat-producing electrical components are loaded on the lower board 25 in a heat transferable manner. The heat of the electrical components 37 and 39 is dissipated to the heat-dissipating planar part 31 side through the heat-conducting through members 42 of the lower board 25, and the electrical components 37 and 39 are cooled. The shape of the inverter box 53 is the shape in which a step 53a is provided in accordance with a difference of elevation between the smoothing capacitor 37 and the upper board 26.

According to the above described configuration, in the case in which the inverter 52 is provided at the rear end surface of the inverter-integrated electric compressor 51, the dimension in the length direction of the inverter-integrated electric compressor 51 can be made compact and the weight thereof can be made light. More specifically, in the conventional inverter-integrated electric compressor, the lower board 25 cannot be directly installed on the heat-dissipating planar part 54, and therefore, in the rear end surface of the housing 2, the lower board 25 is installed to cover the top (rear) of the tallest smoothing capacitor 37, and the other short switching elements 39 and the like are installed on the undersurface side (front side) of the lower board 25. As for the heat-producing switching elements 39, the height of the heat-dissipating planar part 54 is raised to the switching elements 39 side, and the switching elements 39 are caused to abut thereon, whereby the switching elements 39 are cooled. Therefore, a useless thickness is added to the heat-dissipating planar part 54, and the thickness of the end surface of the housing 2 increases to be more than necessary, which leads to increase in size and increase in weight. However, according to the present configuration, the lower board 25 can be directly installed on the heat-dissipating planar part 54. Therefore, a useless thickness does not have to be added to the heat-dissipating planar part 54, which can contribute to miniaturization and reduction in weight.

It goes without saying that the present invention is not limited to only the aspects of the above described first and second embodiments. For example, in each of the first and second embodiments, the lower board 25 is set as the thermally-conductive substrate with the configuration in which the heat-conducting through members 42 constituted of good thermal conductor such as copper are filled through in the substrate body 41 formed from glass epoxy or the like, but may be a thermally-conductive substrate of another kind. In short, the lower board 25 may be of any kind, as long as the heat of the electrical components which are surface-mounted on the lower board 25 is transmitted through the lower board 25 and is dissipated to the heat-dissipating planar part 31 side.

REFERENCE SIGNS LIST 1, 51 INVERTER-INTEGRATED ELECTRIC COMPRESSOR
2 HOUSING
8 SCROLL COMPRESSION MECHANISM
10 ELECTRIC MOTOR
21, 52 INVERTER
23, 53 INVERTER BOX
25 LOWER BOARD (CONTROL CIRCUIT BOARD)
31, 54 HEAT-DISSIPATING PLANAR PART
34 INSULATING SHEET
37 SMOOTHING CAPACITOR (HEAT-PRODUCING ELECTRICAL COMPONENT, NOISE SUPPRESSING MEMBER)
38 COIL (HEAT-PRODUCING ELECTRICAL COMPONENT)
39 SWITCHING ELEMENT (HEAT-PRODUCING ELECTRICAL COMPONENT)
40 PLANAR TERMINAL
41 SUBSTRATE BODY
42 HEAT-CONDUCTING THROUGH MEMBER
43 CIRCUIT PATTERN
53 INVERTER BOX

The invention claimed is:

1. An inverter-integrated electric compressor, comprising
an inverter box provided on an outer surface of a housing that contains a compressor for a refrigerant and an electric motor that drives the compressor,
an inverter that has a control circuit board and is housed and installed in the inverter box, and
a heat-producing electrical component that is loaded on the control circuit board and constitutes the inverter,
a heat-dissipating planar part that constitutes an outer wall of the housing being formed inside the inverter box, and
heat of the electrical component being cooled by being dissipated to the heat-dissipating planar part side,
wherein the control circuit board serves as a thermally-conductive substrate,
the thermally-conductive substrate includes a substrate body made of an insulator, and a heat-conducting through member made of a good thermal conductor and filled through in a thickness direction of the substrate body,
the heat-conducting through member is located on the thermally-conductive substrate to conform to a loading position of the electrical component, and
in the heat-conducting through member, one end surface thereof is disposed in a heat transferable manner on the heat-dissipating planar part, and the electrical component is disposed in a heat transferable manner on the other end surface.

2. The inverter-integrated electric compressor according to claim 1,
wherein a thickness of the heat-conducting through member is set to be slightly larger than a thickness of the substrate body, and out of the end surfaces of the heat-conducting through member, at least the end surface which is in contact with the heat-dissipating planar part is slightly projected from a surface of the substrate body.

3. The inverter-integrated electric compressor according to claim 1,
wherein the electrical component is of a surface mount type which is directly mounted on a surface of the control circuit board.

4. The inverter-integrated electric compressor according to claim 1,
wherein the control circuit board is a multilayered board.

5. The inverter-integrated electric compressor according to claim 1,
wherein the inverter box is provided on an end surface of the housing.

6. The inverter-integrated electric compressor according to claim 1,
wherein the electrical component that is mounted on the control circuit board is a switching element.

7. The inverter-integrated electric compressor according to claim 1,
wherein the electrical component that is mounted on the control circuit board is a noise suppressing member.

* * * * *